(12) United States Patent
Hardcastle et al.

(10) Patent No.: US 6,178,025 B1
(45) Date of Patent: Jan. 23, 2001

(54) OPTICAL NETWORK LOSS-OF-SIGNAL DETECTION

(75) Inventors: Ian Hardcastle, Harlow; Kim Bryon Roberts, Welwyn Garden, both of (GB)

(73) Assignee: Nortel Networks Limited, Montreal (CA)

( * ) Notice: Under 35 U.S.C. 154(b), the term of this patent shall be extended for 0 days.

(21) Appl. No.: 08/984,394

(22) Filed: Dec. 3, 1997

(51) Int. Cl.[7] ............... H04B 10/02; H04B 10/08; H04B 10/00; G01R 31/08
(52) U.S. Cl. ............... 359/177; 359/177; 359/110; 359/161; 359/128; 370/222
(58) Field of Search ............... 359/119, 110, 359/128, 161, 177; 370/222, 223

(56) References Cited

U.S. PATENT DOCUMENTS

| | | | |
|---|---|---|---|
| 4,893,002 | 1/1990 | Kollanyi | 250/214 |
| 4,973,953 | * 11/1990 | Shimokawa et al. | 340/825.05 |
| 5,018,132 | 5/1991 | Williams | 370/13 |
| 5,224,128 | 6/1993 | Grallert | 375/104 |
| 5,239,174 | * 8/1993 | Klein et al. | 250/226 |
| 5,446,725 | * 8/1995 | Ishiwatari | 370/16.1 |
| 5,513,029 | 4/1996 | Roberts | 359/177 |
| 5,557,265 | 9/1996 | Moothart et al. | 340/635 |
| 5,563,893 | 10/1996 | Lai | 371/6 |
| 5,572,515 | 11/1996 | Williamson | 370/17 |
| 5,629,789 | * 5/1997 | Myers et al. | 359/177 |
| 5,636,203 | 6/1997 | Shah | 370/244 |
| 5,805,319 | * 9/1998 | Chuzenji | 359/110 |
| 5,949,560 | * 9/1999 | Roberts et al. | 359/110 |
| 6,005,694 | * 12/1999 | Liu | 359/110 |

OTHER PUBLICATIONS

Journal of Lightwave Technology, vol. 11, No. 5/6, May/Jun. 1993 pp. 667 to 679, A Transport Network Layer Based on Optical Network Elements, G.R. Hill et al.
IEEE Communications Magazine, Nov. 1996, pp. 136 50 142, Operation and Maintenance for an All–Optical Transport Network, Mathias Bischoff et al.

* cited by examiner

Primary Examiner—Jason Chan
Assistant Examiner—M. R. Sedighjan
(74) Attorney, Agent, or Firm—Lee, Mann, Smith, McWilliams, Sweeney & Ohlson

(57) ABSTRACT

Loss of optical signal is detected in a synchronous communications system by detecting features of a monitor signal occurring at a detection frequency corresponding to the frame rate. Since the frame rate is substantially less than the bit rate, monitoring and detection can be performed at a lower bandwidth than the bit rate. An auto-correlation circuit utilises delays which are an integral multiple of the frame rate and produces a detection value which is compared with a threshold value. Alternatively, detection may be based on a power measurement of a band pass filtered monitor signal by setting the lower bandwidth limit above zero frequency and normalizing the measurement of power relative to an average power measurement. A loss of signal may then be detected by a change in power measurement relative to a threshold and can be used for asynchronous systems as well as synchronous systems. Loss of signal detection may be utilised to control an optical switch to re-route optical signals and generate alarm signals. The use of such detection in all optical networks avoids the requirement for electronic processing at the bit rate as a means of detection of loss of signal.

47 Claims, 10 Drawing Sheets

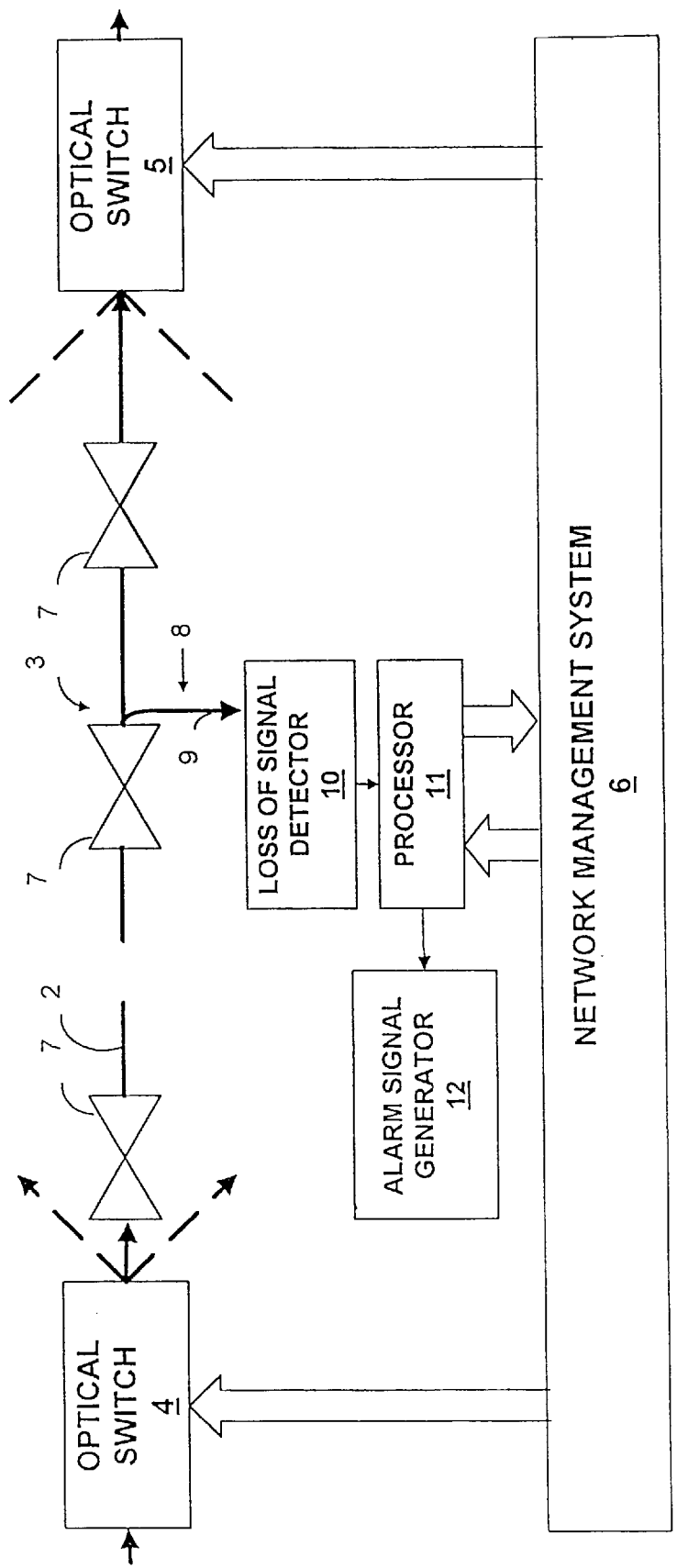

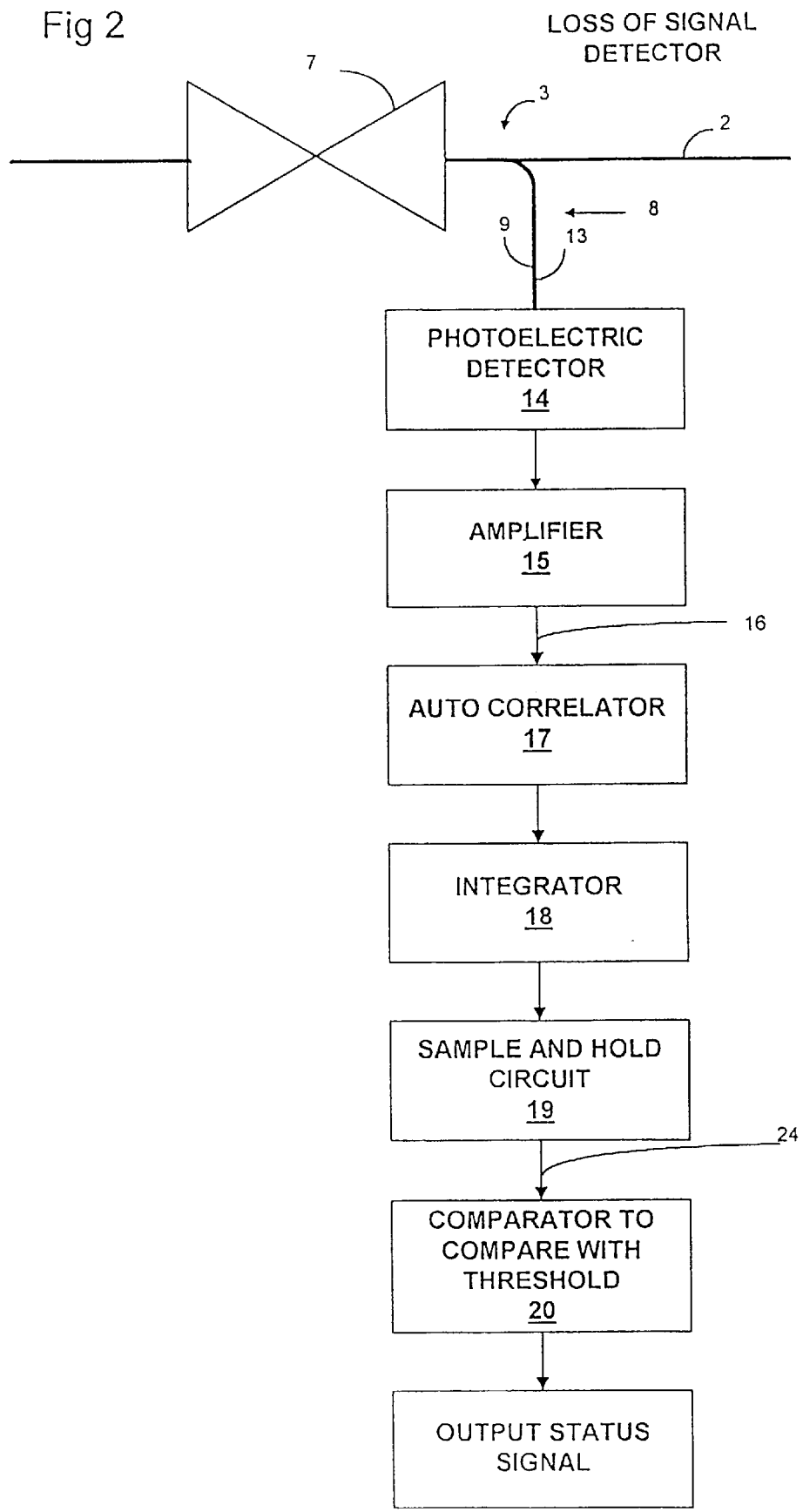

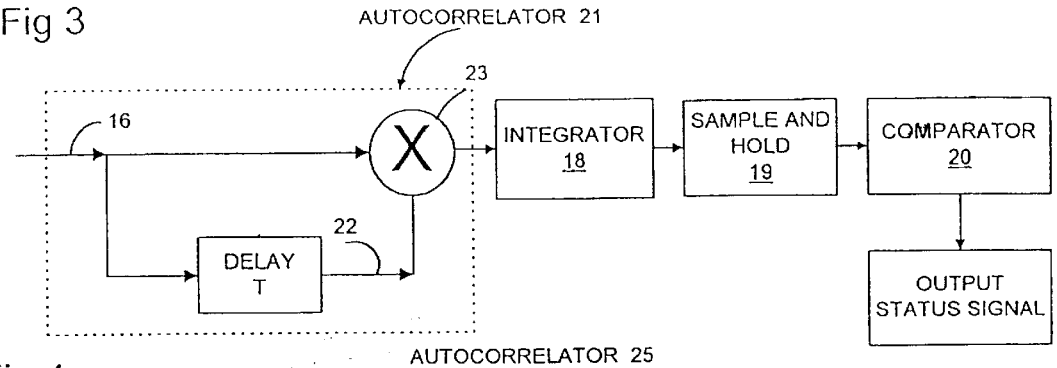
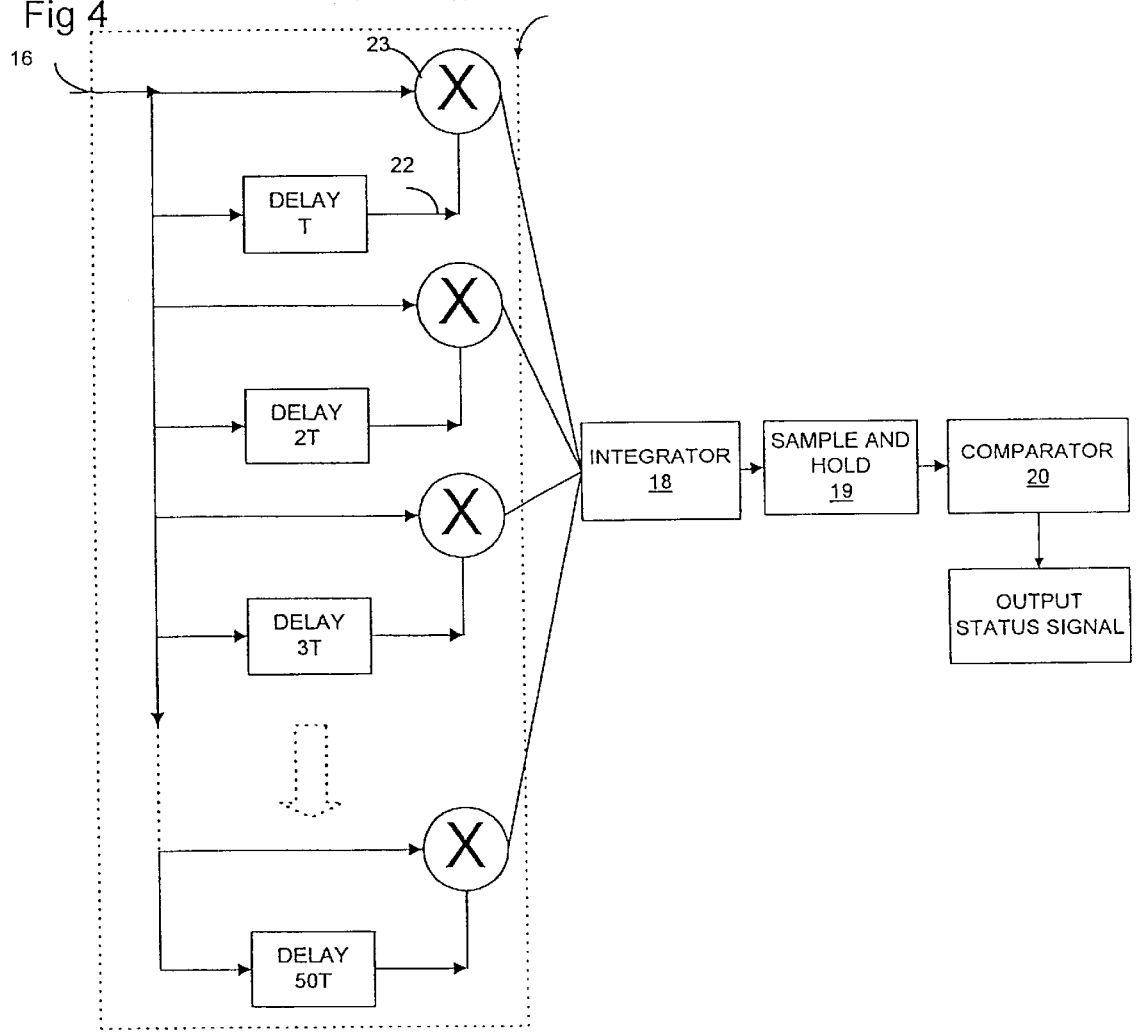

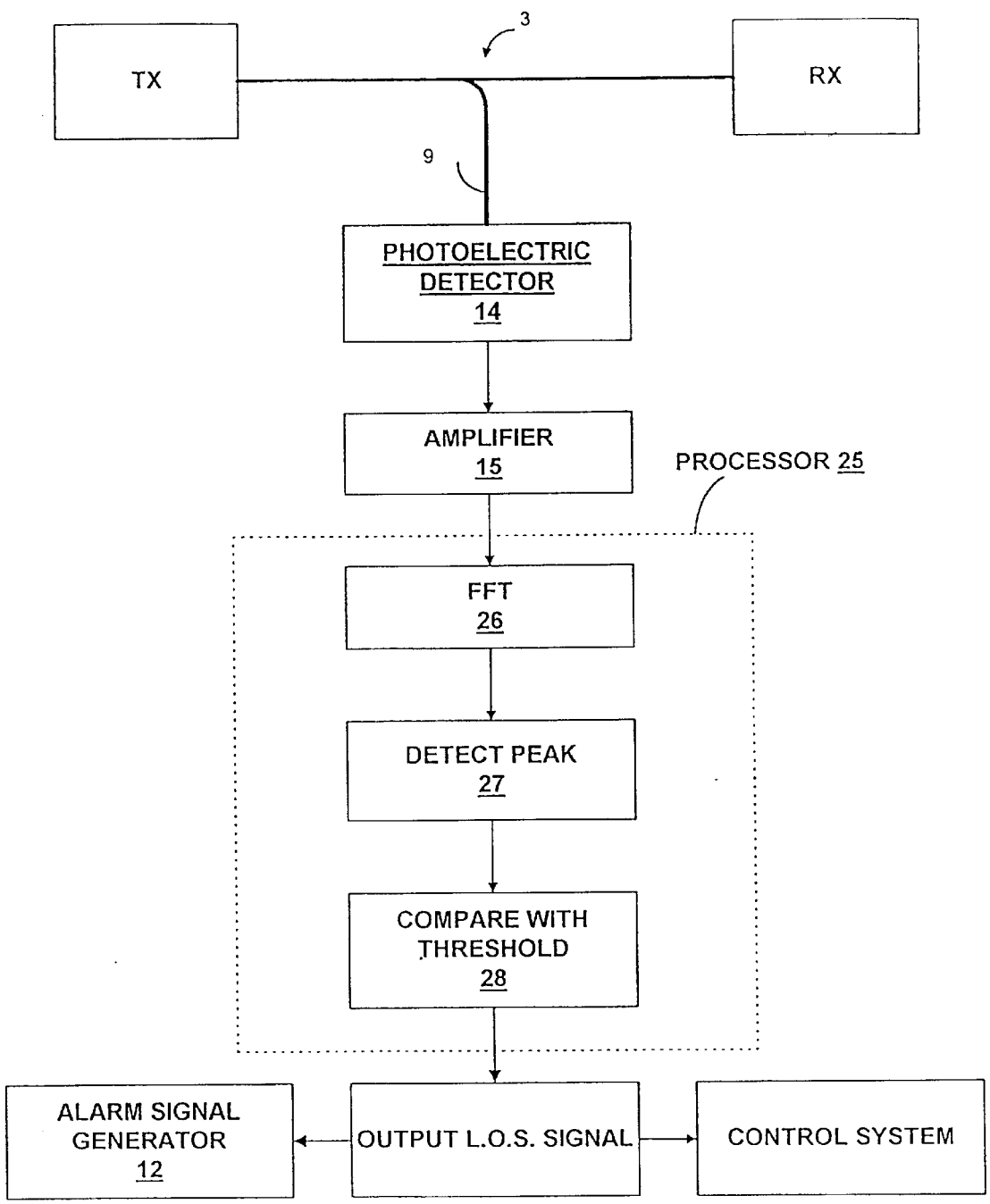

OPTICAL NETWORK

○ NETWORK NODES

□ MONITORING LOCATIONS

STS-1 FRAME FORMAT

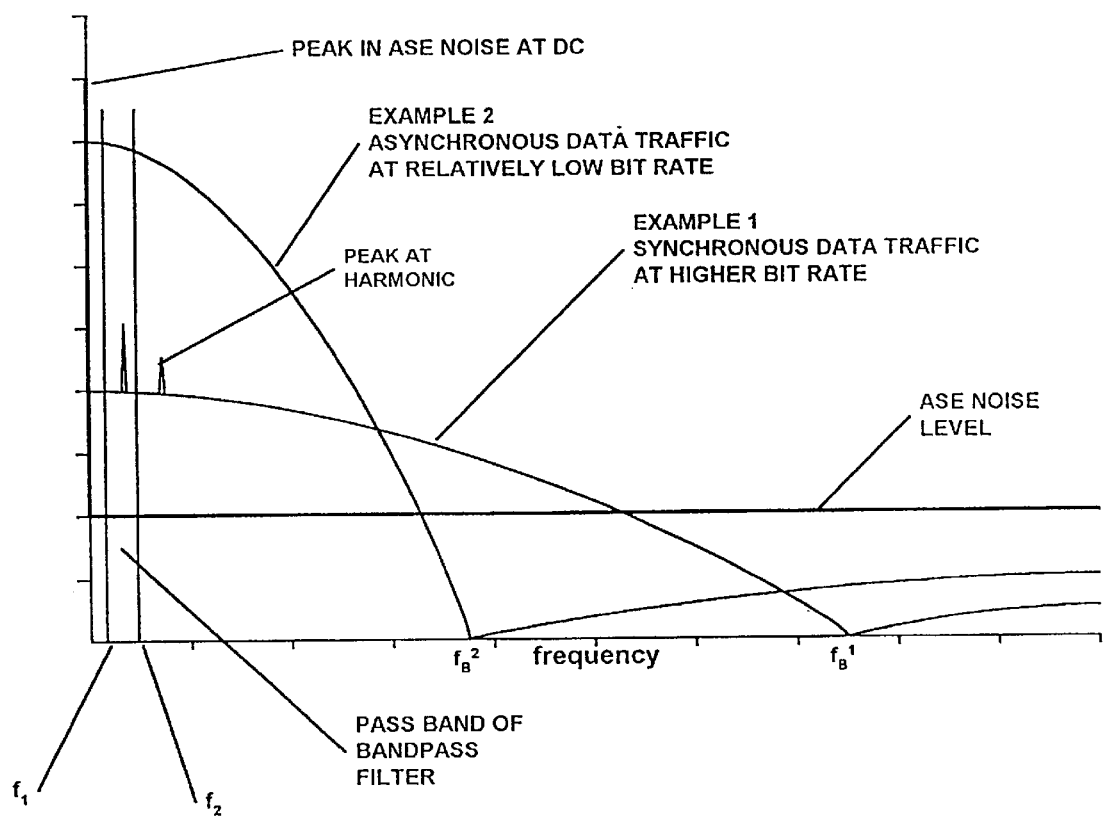

OPTICAL NETWORK LOSS-OF-SIGNAL DETECTION

FIELD OF THE INVENTION

This invention relates to the detection of a loss of signal condition in an optical communications system and in particular, but not exclusively, to the detection of a loss of signal condition in an all optical synchronous communications network.

BACKGROUND TO THE INVENTION

Existing optical communications networks comprise a large number of system elements connected by optical fibres. A defect in such a network resulting in a loss of signal can be detected at a receiver by digital processing of the received signal bits after photoelectric conversion as described for example in U.S. Pat. No. 5,563,893 and U.S. Pat. No. 5,572,515. The majority of modern communications networks are synchronous communications systems conforming to frame format specifications such as those defined in accordance with the SONET standard specified by the American National Standards Institute (T1.105-199X, "American National Standard for Telecommunications—Digital Hierarchy—Optical Interface Rates and Formats Specification (SONET)").

It is anticipated that the next generation of optical networks will rely increasingly on system elements such as cross connects (optical switches) which are all optical in that they function without conversion to the electrical domain. There is also a tendency towards propagation at higher bit rates of 10 Gbit/s or higher making it increasingly more attractive to rely upon all optical processing, particularly where an element is remotely located, in view of the complexity and cost of ultra high speed electronic circuits.

As noted by Mathias Bischoff et al in IEEE Communications Magazine, November 1996, "Operation and Maintenance For An All Optical Transport Network", an important aspect of operation and maintenance of such all optical transport networks is likely to be the provision of optical failure detectors at various parts of the network, to enable defects in the network to be rapidly identified and remedial action taken appropriately. It is proposed for example that loss of signal may be detected by measurement of optical channel power. Channel power is however an unreliable indicator of signal presence because, in the absence of a data carrying signal, optical amplifiers and repeaters in a span of the network will tend to compensate by amplifying random noise, thereby fully or partially restoring the level of optical channel power in the absence of the data carrying signal. It is alternatively proposed that loss of signal may be detected as a result of the decoding process since the decoding apparatus will be unable to maintain synchronisation with a frame structure of received signals when a loss of signal condition exists. Other forms of signal degradation may also be detected at the decoding stage by measurement of signal to noise ratios or analysis of eye pattern statistics. Such decoding however requires conversion to the electrical domain and processing at the full bit rate of the data transmission.

Other known methods of monitoring the performance of optical communications systems include the modification of transmitted signals by the addition of a signature which can subsequently be traced through the system, as for example described in U.S. Pat. No. 5,513,029 which proposes the use of low frequency dither signals. The use of such dither or other forms of tracing signatures however may not be acceptable in a highly complex network accessed by many users and it would be preferable to avoid the need to modify the content of the optical signals carried by the system.

There remains a need to provide for loss of signal detection in such optical networks in a manner which is relatively simple to implement and cost-effective, thereby enabling loss of signal detection to be implemented at a large number of distributed monitoring locations of the network.

SUMMARY OF THE INVENTION

It is an object of the present invention to provide a method and apparatus for monitoring the transmission of an optical signal to determine the existence of a loss of signal condition in a communications system.

It is a further object of the present invention to provide loss of signal detection without reliance upon the processing of electronic signals at the bit rate of the communications carried by the optical signal.

It is a further object of the present invention to provide an optical communications system in which defects are identified and located using loss of signal detectors and in which the routing of data traffic is controlled to avoid such defects.

According to one aspect of the present invention there is disclosed a method of monitoring the transmission of an optical signal to determine the existence of a loss of signal condition in a communications system in which the optical signal is modulated at a bit rate with a digitally coded data stream; the method comprising the steps of:

(a) monitoring the optical signal at a monitoring location of the system to obtain a monitor signal representative of the optical signal;

(b) detecting the presence of features of the monitor signal occurring at a detection frequency lower than the bit rate and corresponding to a periodicity of recurrence of a feature of the digitally coded data stream; and (c) determining whether a loss of signal condition exists in dependence upon the results of said detecting step.

Preferably the optical signal is monitored such that the monitor signal has a bandwidth lower than a bit rate frequency corresponding to the bit rate. In a synchronous communications system where a protocol defines a frame structure the data stream will typically contain features such as bit sequences defining framing bytes occurring at a predetermined frame rate, further features typically occurring at frequencies which are harmonics of the frame rate frequency. Since the frame rate is substantially lower than the bit rate, the bandwidth of the monitor signal need only be sufficient to allow adequate detection at the detection frequency. The electronics required to implement such detection and determining of loss of signal is thereby substantially simplified in complexity due to the relaxation in bandwidth requirement when compared with processing at the full bit rate.

Preferably the detecting step comprises an auto-correlation process using either a single delayed monitor signal or a series of delayed monitor signals which are delayed by respective integral multiples of a delay period. In the case of detection at the frame rate frequency, the delay period corresponds to the frame period.

Wavelength multiplexed optical signals may be demultiplexed prior to photoelectric conversion and may be subject to separate monitoring, detecting and determining steps in order to determine whether a loss of signal condition exists in respect of each of the separate components.

Detection of loss of signal may be utilised to operate an optical switch to effect re-routing of optical signals or to output a control signal to a network management system controlling the routing of traffic within the system to avoid a defect identified by the existence of the loss of signal condition.

Complex networks may be provided with a plurality of loss of signal detectors at monitoring locations distributed throughout the network.

The detection step may alternatively utilise a band pass filter passing the detection frequency, provided that the filter has a lower cut off frequency which is greater than zero frequency (DC).

The present invention also comprises apparatus and systems for use in the above method.

According to a second aspect of the present invention there is disclosed a method of monitoring the transmission of an optical signal to determine the existence of a loss of signal condition in a communications system in which the optical signal is modulated at a bit rate with a digitally coded data stream; the method comprising the steps of:

(a) monitoring the optical signal at a monitoring location of the system to obtain a monitor signal representative of the optical signal;

(b) measuring a characteristic of the monitor signal within a defined bandwidth bounded by a lower frequency limit which is greater than zero and an upper frequency limit which is less that the bit rate; and (c) determining whether a loss of signal condition exists in dependence upon the results of said measuring step.

Preferably the measured characteristic is representative of the power of the optical signal within the defined band width normalised relative to the average power of the optical signal.

In an embodiment, the monitor signal is input to a band pass filter to obtain a filtered signal and the monitor signal is also input to a low pass filter to obtain an average power signal, the filtered signal being divided by the average power signal to obtain a normalised filtered signal which is then compared with a threshold value.

This aspect of the invention may be used for both synchronous and asynchronous communications systems since it does not rely on distinctive repetitive features of the data stream.

Preferred embodiments of the present invention will now be described by way of example only and with reference to the accompanying drawings.

BRIEF DESCRIPTION OF THE DRAWINGS

FIG. 1 is a schematic diagram of part of an optical communications system having a loss of signal detector;

FIG. 2 is a schematic diagram of the loss of signal detector of FIG. 1;

FIG. 3 is a schematic diagram of an auto-correlator operating on a monitor signal and using a single delayed monitor signal;

FIG. 4 is a schematic diagram of a further auto-correlator operating on a monitor signal and utilising a plurality of delay periods;

FIG. 5 is a schematic diagram of an alternative loss of signal detector utilising a Fourier transform technique;

FIG. 11 is a graphical representation of power spectral density for typical systems.

DESCRIPTION OF PREFERRED EMBODIMENTS

Figure 6:
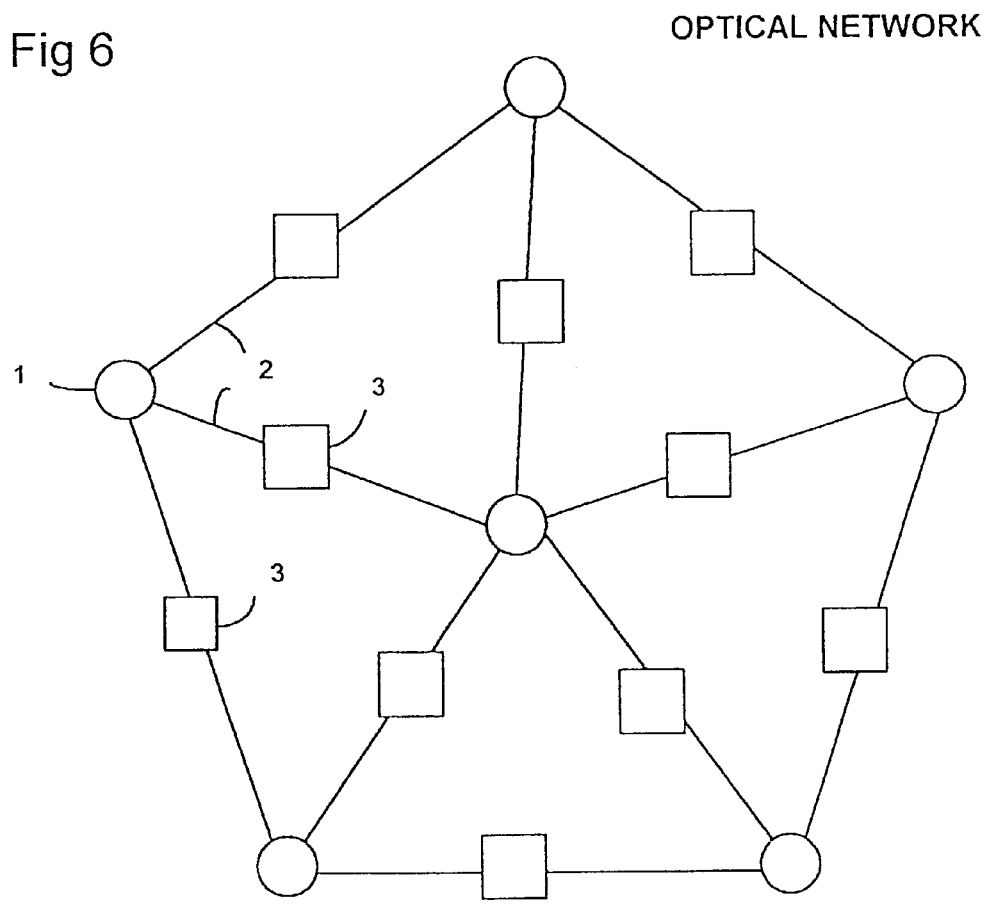
FIG. 6 is a schematic representation of a network having a plurality of nodes and a plurality of loss of signal detectors.

FIG. 6 illustrates schematically an optical network in which a series of network nodes 1 represented by circles are connected via waveguides 2. In this example, loss of signal is detected at a number of monitoring locations 3 indicated by squares. In the event of failure of any particular waveguide of the network, signals may be re-routed to provide communication between the network nodes, providing the precise location of the defect is known. A practical network is likely to be a mesh network having far greater complexity than shown in FIG. 6 but similarly would be provided with an appropriate system of monitoring locations.

FIG. 1 illustrates in greater detail the manner in which an optical signal is transmitted between a first node 4 and a second node 5, each of which comprises an optical switch connected to a plurality of waveguides and operable to selectively route optical signals under the control of a network management system 6.

An optical signal transmitted between the first and second nodes 4 and 5 is routed via a waveguide 2 and periodically amplified by bidirectional optical amplifiers 7. At a monitoring location 3, an optical tap 8 extracts an optical tap signal 9 representative of the optical signal transmission in a selected direction (towards the second node 5 in this example), the optical tap signal being input to a loss of signal detector 10. The status of the loss of signal detector 10 is monitored by a local processor 11 which generates a control signal directed to the network management system 6 in the event of a loss of signal condition being detected.

The processor 11 is also connected to an alarm signal generator 12 for generating an alarm signal for initiating further investigation and remedial action by an operator.

The network management system 6 may for example instruct the optical switch 4 to redirect the optical signal via an alternative route so that the waveguide 2 is no longer utilised until the defect has been rectified.

FIG. 2 shows schematically in greater detail the structure of the loss of signal detector 10 of FIG. 1. An optical tap waveguide 13 is input to a photoelectric detector 14 producing an electrical signal output which is amplified by a transimpedance amplifier 15 having a bandwidth of 10 MHz. The amplifier 15 outputs a monitor signal 16 which is input to an auto-correlator 17 responsive to events in the monitor signal occurring at a detection frequency corresponding to a frame rate of the optical signal from which the optical tap signal 9 is derived. The output of the auto-correlator 17 is integrated by an integrator 18 whose output is input to a sample and hold circuit 19 producing a detection value 24 of the auto-correlation process. The detection value 24 is compared with a threshold value by a comparator 20 and a status signal is output according to whether the amplitude (i.e. modulus) of the detection value exceeds the threshold value. If the detection value 24 is less than the threshold value, then the output status signal is representative of the existence of a loss of signal condition.

Figure 9:
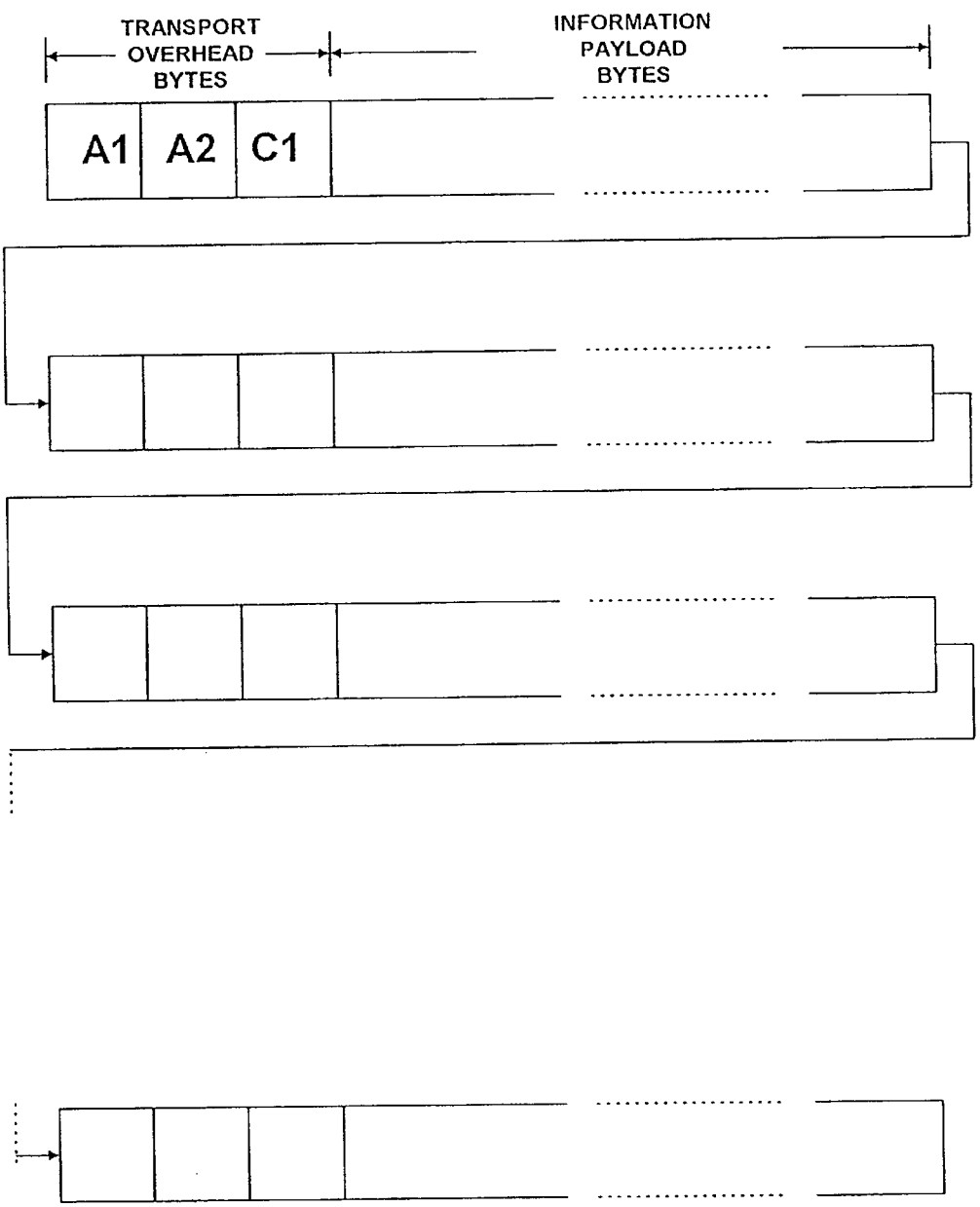
FIG. 9 is a frame format diagram for SONET STS-1 data transmission.

The occurrence of auto-correlated events in the monitor signal 16 may be understood from the frame format diagram of FIG. 9 which corresponds to the STS-1 frame format of SONET. The frame structure is comprised of nine rows, each row consisting of 90 bytes, the first three bytes of each row being transport overhead bytes and the remaining bytes being allocated to information payload. The bytes are transmitted in an order corresponding to reading the rows left to right and top to bottom. The first two bytes A1, A2 of each frame represent framing bytes which are used during decoding as a basis for frame synchronisation, and are followed by a third byte C1 which is an ID code representing the signal level in the SONET signal hierarchy (in this case corresponding to STS-1). Each byte of the frame consists of eight bits and, with the exception of the first three bytes A1, A2 and C1, the series of bits is scrambled, the same pseudo-random sequence ($2^7$-1) being utilised in a synchronised manner in the scrambling operation for each frame. The frame rate is 8 kHz giving a bit rate of 51.84 Mbps. The bit structure of the first three overhead bytes A1, A2, C1 is repeated from frame to frame and there are typically some further repetitive bit structures within each frame provided by the scrambled overhead bytes in subsequent rows and also any repeated bit pattern within the information payload bytes. The effect of scrambling in the context of SONET frames does not destroy the repetitive bit structure since the pseudo-random sequence used for the scrambling process is identically repeated at each frame.

The result of auto-correlation for such a frame structure is to provide a detection value which is related to the number of bits repeated from frame to frame. The net effect of data traffic will typically be a zero contribution to the detection value, except in circumstances where data bits are repeated from frame to frame as for example in the case of zero data transmission. The required sensitivity of the auto-correlator will depend on the frame structure insofar as the frame structure determines the number of bits repeated from frame to frame. Where a number of wavelength multiplexed signals are transmitted via the same waveguide, the auto-correlator will respond cumulatively to the repeated bits in each of the component signals, assuming that the detector 14 is equally responsive to all of the wavelength components. It is not necessary for any regular phase relationship to exist between the frames of the different wavelength components, it being sufficient for the frame period to be of common duration.

A relatively simple auto-correlator is shown for example in FIG. 3 which shows an analogue auto-correlator circuit 21 in which the monitor signal 16 is delayed by a delay period T equal to the frame period, the resulting delayed monitor signal 22 being multiplied by the monitor signal 16 in a multiplier circuit 23. The output of the multiplier circuit 23 is input to the integrator 18 whose output is sampled by a sample and hold circuit 19 to provide the detection value 24 which is compared in amplitude with a threshold value in comparator 20.

Greater sensitivity may be achieved using the analogue auto-correlator circuit 25 of FIG. 4 in which a series of delay circuits are provided to obtain a series of outputs obtained by multiplying the monitor signal 16 with delayed monitor signals corresponding to delays of T, 2T, 3T, . . . 50T. These outputs are summed in the integrator 18. The auto-correlator may thereby achieve better sensitivity and improved signal-to-noise by detecting correlation over a number of frame periods allowing total loss of signal to be clearly detected and also to provide warning of incipient failure (a plurality of graded threshold levels may be provided in this respect if required). The response time of the auto-correlator 25 will however correspondingly increase so that in practice an optimum number of frame periods will need to be selected to provide adequate sensitivity and acceptable response time. Typically a response time not exceeding 10 m sec is preferred.

Auto-correlation may alternatively be implemented by digital signal processing by conversion of the output of the photodetector 14 to digital form and inputting the digital data to a processor. The auto-correlators of FIGS. 3 and 4 may be emulated by appropriate algorithms. In particular, the auto-correlator of FIG. 4 may be configured to include a variable number of delays, the auto-correlator thereby being adaptive to system requirements.

In an alternative apparatus shown in FIG. 5, digital processing is utilised to detect correlation by a fast Fourier transform process in which digital data is analysed to produce a spectral profile of the detected monitor signal 16. A peak in the spectral profile occurring at the detection frequency corresponding to the frame rate provides detection of bit repetition in the transmitted frames. The size of the detected peak in the spectrum is then detected and compared with a threshold, the loss of signal condition being determined to exist if the detected peak value falls below the threshold.

In FIG. 5, the processing steps carried out by processor 25 are represented schematically by the fast Fourier transform step 26 followed by peak detection step 27 and comparison step 28.

Figure 7:
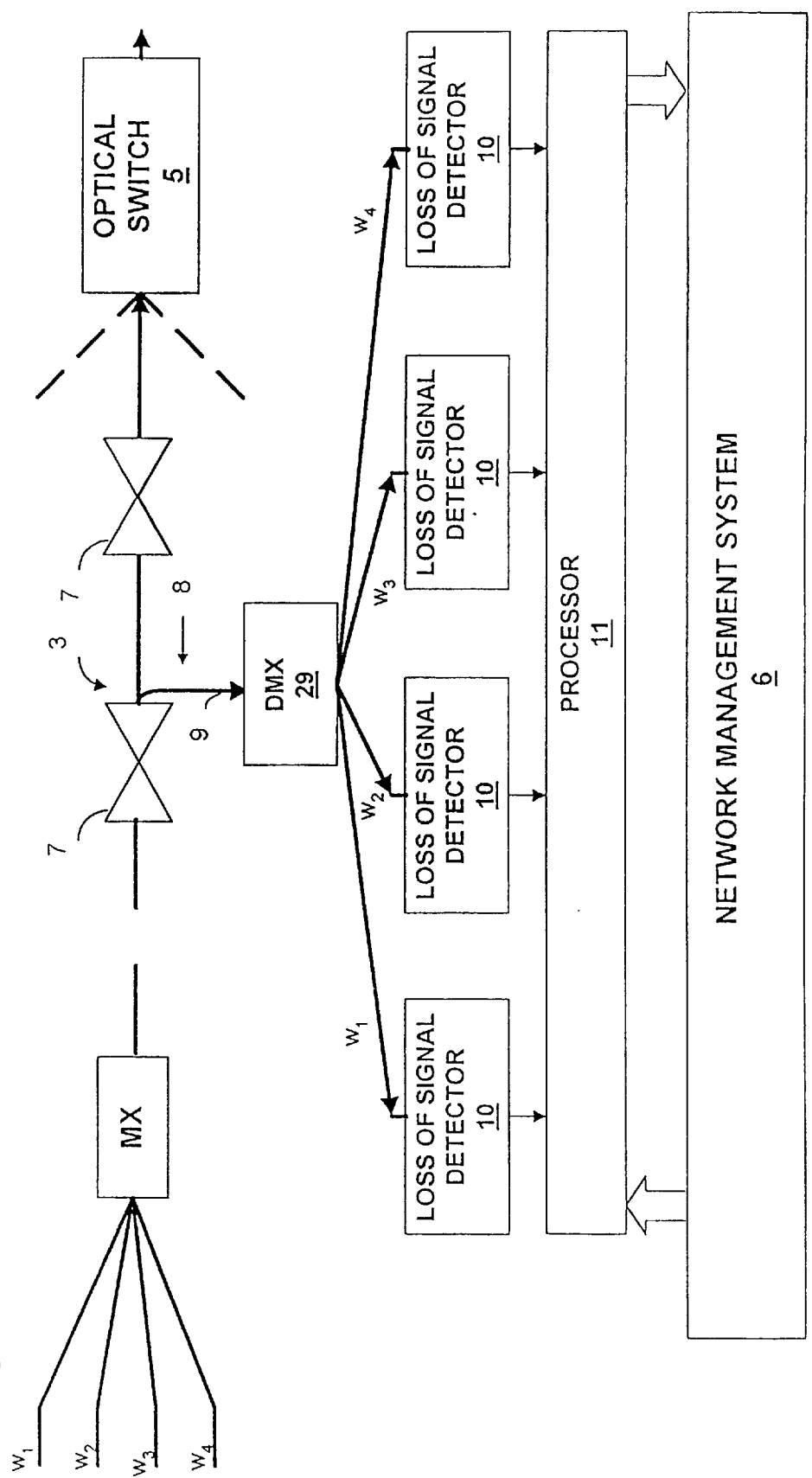
FIG. 7 is a schematic diagram of a loss of signal detector used with a wavelength multiplexed signal.

In a complex optical network, wavelength multiplexed signal components transmitted in a given waveguide 2 are likely to have followed different transmission paths through various optical switches of the network before arriving at the monitoring location 3. It may therefore be desirable for the purpose of fault location to separate the wavelength components when carrying out the loss of signal detection as shown for example in FIG. 7. The output of the optical tap 8 is input to a demultiplexer 29 which outputs optical tap signal components $w_1$, $w_2$, $w_3$, $w_4$ to individual loss of signal detectors 10 connected to processor 11. Other arrangements are also envisaged in which a single loss of signal detector 10 sequentially receives tap signals 16 corresponding to the single wavelength components $w_1$, $w_2$, $w_3$, $w_4$, the tap signals being obtained by switching the outputs of the demultiplexer 29 or by using a variable wavelength controlled filter to select individual components as the input to the loss of signal detector.

Figure 8:
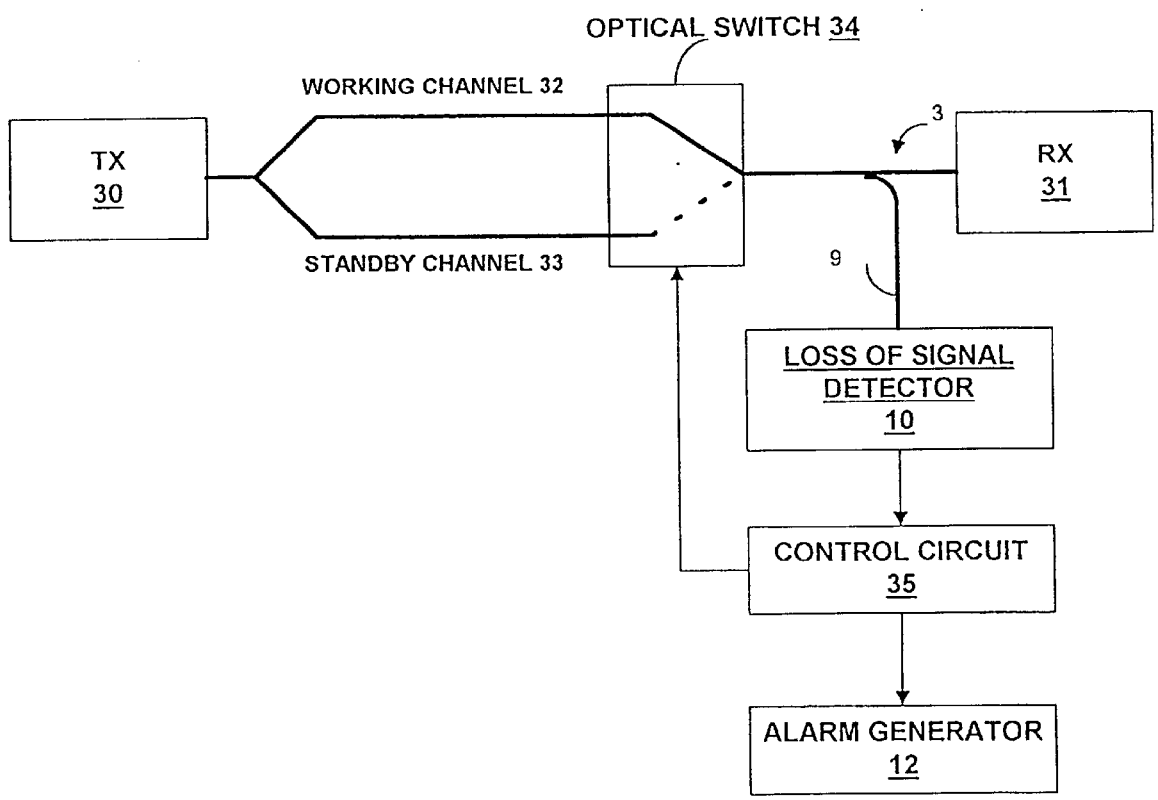
FIG. 8 is a schematic diagram of a local network having an optical switch controlled by a loss of signal detector.

A loss of signal detector 10 may also be utilised in a local network as shown for example in FIG. 8 where connection between a transmitter 30 and a receiver 31 is provided by a working channel 32 or by a standby channel 33 selectively connected to the receiver by means of an optical switch 34. Each of the working channel 32 and standby channel 33 will typically comprise a single optical fibre, the integrity of which may be monitored by a loss of signal detector 10 located for example adjacent to the receiver 31. The loss of signal detector 10 is connected via a control circuit 35 to the optical switch 34 so as to control its operation in the event of a loss of signal condition being detected in the working channel 32, the optical switch 34 then being operated to switch to the standby channel 33, thereby maintaining communication between the transmitter 30 and the receiver 31. An alarm signal generator 12 is actuated to initiate remedial action to rectify the working channel 32.

In the above example, transmission at a relatively low bit rate frequency is described. It will be apparent however that the invention is equally applicable to higher bit rates and in particular at bit rate frequencies of 2.488 GHz or above.

A second embodiment will now be described with reference to FIG. 10 using corresponding reference numerals to those of preceding figures where appropriate for corresponding elements.

Figure 10:
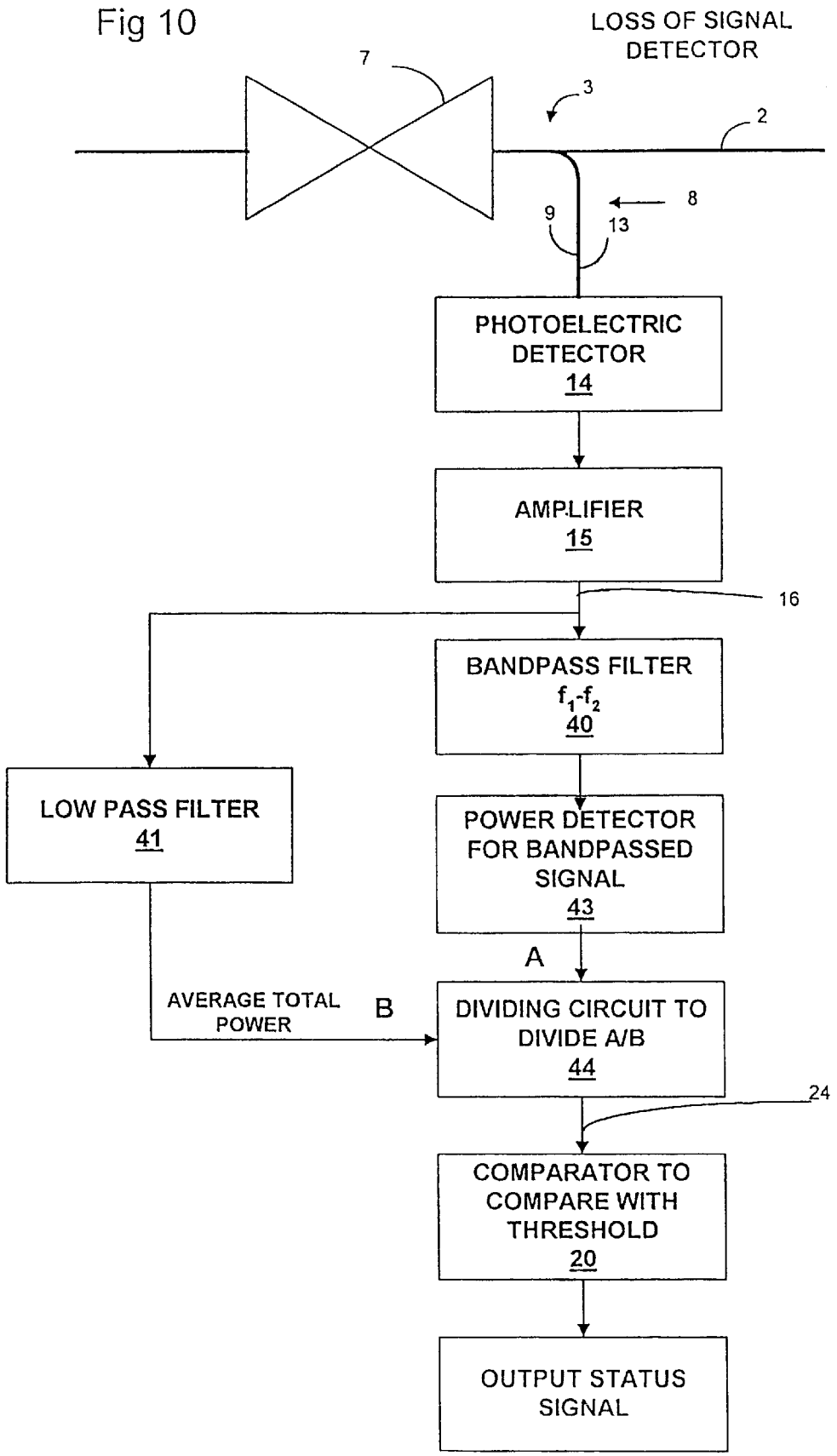
FIG. 10 is a schematic representation of a further loss of signal detector in accordance with the present invention.

The loss of signal detector of FIG. 10 comprises an optical tap 8 deriving an optical tap signal 9 from a data signal carrying waveguide 2. Photoelectric detector 14 produces an electrical signal output which is amplified by a transimpedence amplifier 15 having a bandwidth 10 MHz. This bandwidth is considerably less than the bandwidth required to fully detect the signal since the bit rate frequency will typically be of the order of several GHz.

The amplifier 15 outputs a monitor signal 16 which is input to a band pass filter 40 and, in parallel, is also input to a low pass filter 41. The band pass filter 40 outputs a band pass filtered signal 42 which is filtered with lower and upper cut off frequencies of $f_1$ and $f_2$ respectively, $f_1$ being selected to be above DC(zero frequency) and $f_2$ is selected to be substantially lower than the bit rate frequency $f_B$ as shown schematically in the power spectral density graph of FIG. 11. Typically $f_1$ will be selected to be no less than 10 Hz. Typically, $f_2$ will be selected to be no more than 1 MHz in order to maintain simplicity of electronic processing.

A band passed signal 42 output from the band pass filter 40 is input to a power detector 43 which provides band pass filtered signal A which is representative of the component of power spectral density in the detected optical signal within the bandwidth defined by $f_1$, $f_2$.

The output of the low pass filter 41 provides an average power signal B which is representative of the power spectral density of the detected optical signal at zero frequency (DC).

Signals A and B are input to a dividing circuit 44, thereby providing an output detection value 24 representative of the normalised power spectral density of the band passed signal.

The detection value 24 is input to a comparator 20 which compares the value against a predetermined threshold and outputs a status signal representative of whether loss of signal has been detected. Generally, loss of signal will result in the normalized power spectral density of the band passed signal falling to a level corresponding to the noise level due to ASE (amplified spontaneous emission). The threshold value will therefore in general be selected to be just above the ASE noise level as measured within the frequency range $f_1$ to $f_2$.

The general arrangement described above with reference to FIG. 10 may be adapted in a variety of ways for specific applications as follows.

In the case of a synchronous optical network such as the network referred to in the embodiment of FIGS. 1 to 9, the theoretical power spectral density observed by detection using a square law device (with unlimited bandwidth) has the form shown at Example 1 in FIG. 11 where $f_B^{-1}$ is the bit rate frequency. The power spectral density has a discontinuity at the frame rate frequency $f_F$ in the form of a small peak and further peaks at harmonics of $f_F$. In the event of loss of signal, the power spectral density will assume the ASE noise level due to amplified spontaneous emission which will generally be at a lower level to the power spectral density in the presence of data traffic. The exact form of the ASE noise level curve will depend upon the type of optical amplifiers employed in the system and the manner in which amplifier gain adjusts to loss of signal. The ASE noise level shown schematically in FIG. 11 will in general have a large peak at DC (zero frequency) and a generally flat curve within the remaining frequencies of interest. The value of ASE noise at zero frequency is generally unpredictable and cannot be reliably related to the zero frequency component of power spectral density of the optical signal in the presence of data traffic. The method of this embodiment of the present invention therefore uses the band pass filter to select a portion of the power spectral density curve which does not include zero frequency components and which preferably includes the peak occurring at the frame rate frequency $f_F$ and, additionally or alternatively, one or more harmonics of the frame rate frequency. When loss of signal first occurs, the level of ASE noise will tend to vary transiently before reaching a steady value. By selecting the band pass filter parameters to include the peak at the frame rate frequency, an immediate change in power spectral density is expected since the peak will disappear in the absence of signal. The threshold of the comparator 20 may therefore be set to detect a change of power corresponding to loss of the peak at the frame rate frequency.

If the pass band of the band pass filter 40 is sufficiently narrow, the band pass filter may effectively be regarded as equivalent to the auto-correlator described above with reference to FIGS. 1 to 9. If the band pass filter is implemented with narrow bandwidth by means of a transversal filter arrangement, the structure of the filter may be similar to that of the auto-correlator 25 shown in FIG. 4.

In the case of asynchronous data traffic, no peak in the power spectral density corresponding to the frame rate frequency of Example 1 in FIG. 11 will generally occur and the power spectral density may appear as shown in Example 1 but without the peak at the frame rate frequency. For such an arrangement, detection using a band pass filter as described with reference to FIG. 10 may still be used, provided that the ASE noise level is sufficiently distinct from the normalised power spectral density value produced by the detection process of FIG. 10.

In a further example, asynchronous data traffic at relatively low bit rate is considered with reference to Example 2 of FIG. 11. When relatively low bit rates are utilised, the low frequency component of the power spectral density has relatively greater amplitude, thereby being more readily distinguished from the ASE noise level using the band pass filter technique described above with reference to FIG. 10. Although the band pass filter in Example 2 need not necessarily be at the location shown in FIG. 11, it is advantageous for the band pass filter to be adjacent to, but not including, zero frequency in order to take advantage of the accentuation at power spectral density of the optical signal close to zero frequency.

With increasing bit rate frequencies, it is apparent from FIG. 11 that it becomes increasingly desirable to detect localised peaks in the power spectral density in order to provide increased sensitivity in detection relative to the ASE noise level, either by means of the auto-correlator technique of the first embodiment or by means of the band pass filter technique of the second embodiment provided that the filter passes the detection frequency.

The first embodiment of the present invention described above with reference to FIGS. 1 to 9 is concerned with a synchronous communications system in which an auto-correlator is used to detect a periodically occurring feature of the digitally coded data stream in the form of a series of bits forming framing bytes, as defined by the synchronization protocol.

Typically there may be other features of periodically recurring bit structures such as pointers to specific data areas within frames so that, where such further features are present, pronounced peaks in the power spectral density may occur at harmonics of the frame rate frequency.

It may therefore in some cases be preferable to carry out correlation at one of these harmonics of the frame rate frequency.

The loss of signal detector of the second embodiment described above with reference to FIG. 10 processes the monitor signal such that the characteristic measured is representative of the power of the optical signal in the defined bandwidth normalized relative to the average power of the optical signal. Other characteristics may alternatively be measured, such as the peak to peak signal value measured within the defined bandwidth.

The apparatus of FIGS. 2 and 10 may be configured to utilise either analogue or digital processing.

What is claimed is:

1. A method of monitoring the transmission of an optical signal to determine the existence of a loss of signal condition in a communications system in which the optical signal is modulated at a bit rate with a digitally coded data stream; the method comprising the steps of:
   (a) monitoring the optical signal at a monitoring location of the system to obtain a monitor signal representative of the optical signal;
   (b) detecting the presence of features of the monitor signal occurring at a detection frequency lower than the bit rate and corresponding to a periodicity of recurrence of a feature of the digitally coded data stream; and
   (c) determining whether a loss of signal condition exists in dependence upon the results of said detecting step; wherein the detecting step comprises an auto-correlation process providing a detection value representative of a degree of correlation between the monitor signal and at least one delayed monitor signal corresponding to the monitor signal delayed by a respective integral multiple of a delay period; said delay period corresponding to the inverse of the detection frequency.

2. A method as claimed in claim 1 wherein the communications system is a synchronous communications system whereby the optical signal is transmitted in accordance with a synchronisation protocol, said protocol defining a frame rate for the transmission of frames comprising a predetermined number of bits; and wherein said detection frequency is one of
   (i) a frame rate frequency corresponding to the frame rate; and
   (ii) a harmonic of the frame rate frequency.

3. A method as claimed in claim 1, wherein the optical signal is monitored such that the monitor signal has a bandwidth lower than a bit rate frequency corresponding to the bit rate.

4. A method as claimed in claim 3, including the step of photoelectrically detecting the optical signal to provide the monitor signal as an electrical waveform.

5. A method as claimed in claim 2, wherein the synchronisation protocol is defined in accordance with SONET.

6. A method as claimed in claim 1, wherein the detection value is representative of the degree of correlation between the monitor signal and a single delayed monitor signal where the integral multiple is unity.

7. A method of monitoring the transmission of an optical signal to determine the existence of a loss of signal condition in a communications system in which the optical signal is modulated at a bit rate with a digitally coded data stream; the method comprising the steps of:
   (a) monitoring the optical signal at a monitoring location of the system to obtain a monitor signal representative of the optical signal;
   (b) detecting the presence of features of the monitor signal occurring at a detection frequency lower than the bit rate and corresponding to a periodicity of recurrence of a feature of the digitally coded data stream; and
   (c) determining whether a loss of signal condition exists in dependence upon the results of said detecting step; wherein the detecting step comprises a Fourier transform process providing data representative of a spectral profile of the monitor signal, said determining step being responsive to said data being representative of the presence of a peak in the spectral profile at the detection frequency.

8. A method as claimed in claim 1, wherein the optical signal is wavelength multiplexed from a plurality of component signals having respective wavelengths, the method including the further step of wavelength de-multiplexing the optical signal at the monitoring location to obtain said monitor signal, whereby said monitor signal is representative of a single wavelength component of the optical signal.

9. A method as claimed in claim 1, wherein the detecting step outputs a detection value representative of the strength of detection of the presence of features of the monitor signal occurring at the detection frequency, and wherein the determining step comprises a comparison of the detection value with a predetermined threshold value.

10. A method as claimed in claim 1, including a further step of controlling the operation of an optical switch in response to determining the existence of a loss of signal condition, said optical switch being operated to reroute the optical signal.

11. A method according as claimed in claim 1, including the step of outputting a control signal to a network management system in response to determining the existence of a loss of signal condition, the network management system re-routing communications traffic within the system to avoid a defect identified by the existence of the loss of signal condition at the monitoring location.

12. A method as claimed in claim 11, wherein optical signals are monitored at a plurality of monitoring locations in the system and wherein the network management system determines the routing of communications traffic in dependence upon the determining of the existence of loss of signal conditions at the respective monitoring locations.

13. A method as claimed in claim 9, including the step of generating an alarm signal in response to determining the existence of a loss of signal condition.

14. A method as claimed in claim 2 wherein the periodically recurring feature of the digitally coded data stream comprises a sequence of bits defining framing bytes in accordance with said protocol.

15. Apparatus for monitoring the transmission of an optical signal to determine the existence of a loss of signal condition in a communications system in which optical signals are modulated at a bit rate with a digitally coded data stream; the apparatus comprising:
   (a) monitoring means operable to monitor the optical signal at a monitoring location of the system to obtain a monitor signal representative of the optical signal;
   (b) detecting means operable to effect detection of the presence of features of the monitor signal occurring at a detection frequency lower than the bit rate and corresponding to a periodicity of recurrence of a feature of the digitally coded data stream; and
   (c) determining means operable to determine whether a loss of signal condition exists in dependence upon the results of said detection; wherein the detecting means comprises a processor operable to perform a Fourier transform process providing data representative of a spectral profile of the monitor signal, said determining means being responsive to said data being representative of the presence of a peak in the spectral profile at the detection frequency.

16. Apparatus for monitoring the transmission of an optical signal to determine the existence of a loss of signal condition in a communications system in which optical signals are modulated at a bit rate with a digitally coded data stream; the apparatus comprising:

(a) monitoring means operable to monitor the optical signal at a monitoring location of the system to obtain a monitor signal representative of the optical signal;

(b) detecting means operable to effect detection of the presence of features of the monitor signal occurring at a detection frequency lower than the bit rate and corresponding to a periodicity of recurrence of a feature of the digitally coded data stream; and (c) determining means operable to determine whether a loss of signal condition exists in dependence upon the results of said detection; wherein the detecting means comprises an auto-correlator operable to provide a detection value representative of a degree of correlation between the monitor signal and at least one delayed monitor signal corresponding to the monitor signal delayed by a respective integral multiple of a delay period; said delay period corresponding to the inverse of the detection frequency.

17. Apparatus as claimed in claim 16 wherein the communications system is a synchronous communications system whereby the optical signal is transmitted in accordance with a synchronisation protocol, said protocol defining a frame rate for the transmission of frames comprising a predetermined number of bits; and wherein the detection frequency is one of (i) a frame rate frequency corresponding to the frame rate; and (ii) a harmonic of the frame rate frequency.

18. Apparatus as claimed in claim 16 wherein the monitoring means has a bandwidth lower than a bit rate frequency corresponding to the bit rate.

19. Apparatus as claimed in claim 18 wherein the monitoring means comprises a photoelectric detector operable to detect the optical signal to provide the monitor signal as an electrical waveform.

20. Apparatus as claimed in claim 16, wherein the detection value is representative of the degree of correlation between the monitor signal and a single delayed monitor signal where the integral multiple is unity.

21. Apparatus as claimed in claim 16, wherein the optical signal is wavelength multiplexed from a plurality of component signals having respective wavelengths, the apparatus including wavelength de-multiplexing means operable to demultiplex the optical signal at the monitoring location to obtain said monitor signal, whereby said monitor signal is representative of a single wavelength component of the optical signal.

22. Apparatus as claimed in claim 16, wherein the detecting means is operable to output a detection value representative of the strength of detection of the presence of features of the monitor signal occurring at the detection frequency, and wherein the determining means comprises a comparator operable to compare the detection value with a predetermined threshold value.

23. Apparatus as claimed in claim 22 comprising an alarm signal generator operable to generate an alarm signal in response to said determining means determining the existence of a loss of signal condition.

24. Apparatus as claimed in claim 16 comprising control means operable to control the operation of an optical switch in response to determining the existence of a loss of signal condition, said-optical switch being operated to reroute the optical signal.

25. Apparatus as claimed in claim 16 comprising output means operable to output a control signal to a network management system in response to determining the existence of a loss of signal condition.

26. A method of monitoring the transmission of an optical signal to determine the existence of a loss of signal condition in a communications system in which the optical signal is modulated at a bit rate with a digitally coded data stream; the method comprising the steps of:

(a) monitoring the optical signal at a monitoring location of the system to obtain a monitor signal representative of the optical signal;

(b) measuring a characteristic of the monitor signal within a defined bandwidth bounded by a lower frequency limit which is greater than zero and an upper frequency limit which is less than the bit rate; and (c) determining whether a loss of signal condition exists in dependence upon the results of said measuring step; wherein the characteristic measured in said measuring step is the representative of the power of the optical signal within the defined bandwidth normalized relative to the average power of the optical signal.

27. A method as claimed in 26 including the step of inputting the monitor signal to a bandpass filter defining said defined bandwidth to obtain a filtered signal, inputting the monitor signal to a low pass filter to obtain an average power signal, and dividing the filtered signal by the average power signal to obtain a normalised filtered signal, wherein said determining step comprises comparing the normalised filtered signal with a threshold value.

28. A method as claimed in claim 26 wherein said communications system is a synchronous communications system whereby the optical signals are transmitted in accordance with a synchronisation protocol, said protocol defining a frame rate defining a predetermined number of bits; and wherein said defined bandwidth includes at least one of (a) a frame rate frequency corresponding to said frame rate;

(b) a harmonic of said frame rate frequency.

29. A method as claimed in claim 26 wherein said communications system is an asynchronous communications system.

30. A method as claimed in claim 26 wherein said lower frequency limit is not less than 10 Hz and said upper frequency limit is not more than 1 MHz.

31. A method as claimed in claim 26, including the step of photoelectrically detecting the optical signal to provide the monitor signal as an electrical waveform.

32. A method as claimed in claim 26, wherein the optical signal is wavelength multiplexed from a plurality of component signals having respective wavelengths, the method including the further step of wavelength de-multiplexing the optical signal at the monitoring location to obtain said monitor signal, whereby said monitor signal is representative of a single wavelength component of the optical signal.

33. A method as claimed in claim 26, including a further step of controlling the operation of an optical switch in response to determining the existence of a loss of signal condition, said optical switch being operated to reroute the optical signal.

34. A method according as claimed in claim 26, including the step of outputting a control signal to a network management system in response to determining the existence of a loss of signal condition, the network management system re-routing communications traffic within the system to avoid a defect identified by the existence of the loss of signal condition at the monitoring location.

35. A method as claimed in claim 26, wherein optical signals are monitored at a plurality of monitoring locations in the system and wherein the network management system determines the routing of communications traffic in dependence upon the determining of the existence of loss of signal conditions at the respective monitoring locations.

36. A method as claimed in claim 26, including the step of generating an alarm signal in response to determining the existence of a loss of signal condition.

37. Apparatus for monitoring the transmission of an optical signal to determine the existence of a loss of signal condition in a communications system in which optical signal is modulated at a bit rate with a digitally coded data stream; the apparatus comprising:

(a) monitoring means operable to monitor the optical signal at a monitoring location of the system to obtain a monitor signal representative of the optical signal;

(b) measuring means operable to measure a characteristic of the monitor signal within a defined bandwidth bounded by a lower frequency limit which is greater than zero and an upper frequency limit which is less than the bit rate; and (c) determining means operable to determine whether a loss of signal condition exists in dependence upon the results of said measuring step; wherein the characteristic measured by said measuring means is representative of the power of the optical signal within the defined bandwidth normalized relating to the average power of the optical signal.

38. Apparatus as claimed in 37 wherein the measuring means comprises a bandpass filter defining said defined bandwidth, the monitor signal being input to the bandpass filter to obtain a filtered signal, a low pass filter to which the monitor signal is input to obtain an average power signal, and a dividing circuit dividing the filtered signal by the average power signal to obtain a normalised filtered signal, and wherein said determining means comprises a comparator operable to compare the normalised filtered signal with a threshold value.

39. Apparatus as claimed in claim 37 wherein said communications system is a synchronous communications system whereby the optical signals are transmitted in accordance with a synchronisation protocol, said protocol defining a frame rate defining a predetermined number of bits; and wherein said defined bandwidth includes at least one of (a) a frame rate frequency corresponding to said frame rate; and (b) a harmonic of said frame rate frequency.

40. Apparatus as claimed in claim 37 wherein said communications system is an asynchronous communications system.

41. Apparatus as claimed in claim 37 wherein said lower frequency limit is not less than 10 Hz and said upper frequency limit is not more than 1 MHz.

42. Apparatus as claimed in claim 37, including a photoelectric detector operable to detect the optical signal to provide the monitor signal as an electrical waveform.

43. Apparatus as claimed in claim 37, wherein the optical signal is wavelength multiplexed from a plurality of component signals having respective wavelengths, the apparatus including wavelength de-multiplexing means operable to demultiplex the optical signal at the monitoring location to obtain said monitor signal, whereby said monitor signal is representative of a single wavelength component of the optical signal.

44. Apparatus as claimed in claim 37, including control means operable to control the operation of an optical switch in response to determining the existence of a loss of signal condition, said optical switch being operated to reroute the optical signal.

45. Apparatus as claimed in claim 37, including means for outputting a control signal to a network management system in response to determining the existence of a loss of signal condition, the network management system being operable to re-route communications traffic within the system to avoid a defect identified by the existence of the loss of signal condition at the monitoring location.

46. Apparatus as claimed in claim 37, comprising a plurality of said monitoring means at a plurality of respective monitoring locations in the system and wherein the network management system is operable to determine the routing of communications traffic in dependence upon the determining of the existence of loss of signal conditions at the respective monitoring locations.

47. Apparatus as claimed in claim 37, including alarm generating means operable to generate an alarm signal in response to determining the existence of a loss of signal condition.

* * * * *